United States Patent Office 2,727,879
Patented Dec. 20, 1955

2,727,879
STABILIZED ETHYLENE POLYMER COMPOSITIONS

John R. Vincent, deceased, late of New Castle County, Del., by Margaret B. Vincent, administratrix, Newport, Del., assignor to E. I. du Pont de Nemours & Company, Wilmington, Del., a corporation of Delaware No Drawing. Application December 11, 1951, Serial No. 261,156

5 Claims. (Cl. 260—45.8)

This invention relates to new compositions of matter, and more particularly to new compositions of matter comprising polymers of ethylene.

The polymers of ethylene which are included in the compositions of this invention may be made, for example, by the processes of U. S. Patents 2,153,553 or 2,188,465, or by other processes for producing normally solid polymeric products by polymerization of ethylene in the presence of a catalyst capable of yielding free radicals under the polymerization conditions. The term "ethylene polymer" as employed herein also includes the so-called "telomers" of ethylene, which are normally solid and which are obtained by polymerization of ethylene in the presence of a modifying reactant which supplies the end groups for the polymeric chain. A very great variety of such modifying agents is known, as disclosed in U. S. Patents 2,402,137, 2,405,950, 2,409,683, 2,440,800, and 2,504,400.

It was known heretofore that ethylene polymers upon prolonged exposure to sunlight underwent oxidation and photodegradation reactions which resulted in chemical modifications of the polymeric molecule with a corresponding lowering of tensile strength and impairment of electrical properties; these effects could be suppressed by loading the polymer with a black filler such as carbon black, but this was often not desirable; moreover, the efforts which have been made heretofore to overcome these weathering effects by the use of chemical inhibitors have not been completely successful for reasons explained below.

The previously known light stabilizers (other than carbon black) for normally solid ethylene polymers have been relatively ineffective. The number of inhibitors which have been examined in the hope of finding one having the desired combination of properties is extremely great. In U. S. Patent 2,340,938, certain thioether-substituted metal phenolates are disclosed as thermal depolymerization inhibitors; the patent also states that these same substances inhibit degradation by ultra-violet light of polymers normally resistant to oxidation. In U. S. Patent 2,387,518, stabilizers containing a thiocarboxyl function, in which a carbon atom is directly linked to two atoms of a sulfur family element and also to an atom of a nonmetallic element in group V of the periodic table, one of the said sulfur family atoms being linked to another sulfur family element, are disclosed. In U. S. Patent 2,434,662, numerous classes of inhibitors including heterocyclic compounds containing annular nitrogen, amines, diphenols, etc. are disclosed. In U. S. Patent 2,435,245, the inhibitor to prevent thermal degradation (which is to be distinguished from photodegradation) is a diphenyl amine-acetone condensation product. In U. S. Patent 2,448,799, metal stearates are disclosed in combination with 2-mercaptobenzothiazole, benzo-thiazyl disulfide, thiosorbitol, etc. Thiopropionates as stabilizers for polythene are disclosed in U. S. Patent 2,519,755. Introduction of diphenylamine into polythene by means of a lubricant to impart thermal stability is disclosed in U. S. Patent 2,543,329. British Patent 609,177 teaches the use of diphenylamine in preference to thiourea and other thermal stabilizers, and British Patent 618,839 discloses propyl gallate as a light stabilizer for polythene. None of the compounds disclosed in any of the foresaid patents is a sufficiently effective stabilizer to prevent relatively rapid degradation of the polymer upon weathering in strong sunlight.

An object of this invention is to provide compositions comprising ethylene polymers which have improved physical properties and more particularly improved resistance to weathering.

It has been discovered, in accordance with the present invention, that ethylene polymers which are stabilized with a 2-mercaptoarylenoimidazole compound, i. e. 2-mercaptobenzimidazole (another name for which is 2-benzamidazolethiol) or other compounds having sulfur in the 2-position, attached to the same ring structure, are outstandingly capable of resisting weathering effects in the presence of strong sunlight for prolonged periods of time.

The compounds which are especially effective in combination with ethylene polymers according to the present invention are imidazoles having the characteristic structure

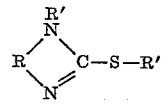

wherein R is an arylene group, such as

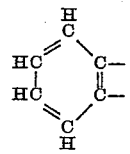

and R' is H or a hydrocarbon group (e. g. ethyl, phenyl, etc.) which is free of ethylenic and acetylenic unsaturation. The two (R')'s need not be the same. The term "arylene" as employed herein means a bivalent aromatic group. To form the imidazole ring the arylene group must have available valence positions on adjacent carbon atoms.

The quantity of 2-mercaptoarylenoimidazole compound which is employed in the practice of this invention is generally within the range of about 0.2 to 5% of the weight of the ethylene polymer, excellent results being obtained when the content of 2-mercaptoarylenoimidazole compound is in the range of about 0.25 to 1.0%. For economic reasons, it is generally better to employ the minimum effective quantity.

In practicing and testing the present invention, numerous methods have been employed for observing the improved results obtained through the use of the 2-mercaptoarylenoimidazole compound as compared with previously known inhibitors for oxidative degradation of ethylene polymers. A suitable test has been found in weathering extruded monofils of the polymer having a diameter of 45 mils by inclining them at a 45° angle, facing south in Hialeah, Florida, and continuing the exposure for a period of months. Close examination of the surface of the monofils determines whether or not exudation has taken place. One of the criteria employed in these weathering tests is the time required for decrease in elongation of a standard ethylene polymer having an elongation of 600% at the start of the test to 200% at the termination of the test. Experience with this method of testing stabilizers indicates that at the time of termination the tensile strength is generally of the order of magnitude of about one-half of the initial tensile strength. Other physical tests are also employed to determine the effectiveness of the stabilizer. For example, when the initial cold brittleness temperature is about −70° C. specimens which develop a cold brittleness temperature greater than 0° C. are regarded as unsatisfactory. When no inhibitor is employed in similar tests, and also when any of the known phenolics are employed as inhibitors, the cold brittleness temperature reaches about +15° C. in about three months. None of the colorless or light-colored ethylene polymers heretofore sold on a commercial basis have had properties better in this respect than those exhibited by the ethylene polymers which are inhibited by phenolic inhibitors. In contrast with this, the compositions obtained in accordance with the present invention have cold brittleness temperatures which are generally as low as −60° C. to −55° C. after a similar period of exposure.

In addition to the actual weathering tests hereinabove described, accelerated weatherometer tests have also been used in studying the properties of the composition herein described. These accelerated tests gave results which were in general in accordance with the actual weathering tests, as hereinafter reported.

The following table shows performance of ethylene polymer compositions containing 2-mercaptobenzimidazole as stabilizer.

TABLE A

Performance of compositions containing 2-mercaptobenzimidazole (2 MB)

| Percent 2 MB | Time of weathering for reduction of elongation from 600% to 200% in Florida (months) |
|---|---|
| 0.05 | 6 |
| 0.1 | 6 |
| 0.2 | 9 |
| 0.2 | 6 |
| 0.5 | 18+ |
| 1.0 | 18+ |
| 1.0 | 18+ |
| 1.0 | 12 |
| 1.0 | 9+ |
| 2.0 | 18+ |

One of the important beneficial properties of 2-mercaptobenzimidazole as a stabilizer for ethylene polymers is the fact that its stabilizing action is generally not adversely affected by other materials which may be added to the polymer. For example, effective amounts of pigments, opacifiers, lubricants, waxes, etc. can be introduced without adversely affecting the stabilizing action of the 2-mercaptobenzimidazole. In certain instances synergistic effects have been observed. This is shown in the four tables given below. Of course, the addition of substances which act as oxidation catalysts have an adverse effect, but this effect is lessened by the presence of 2 MB.

TABLE B

Performance of compositions containing 2 MB with pigments, etc.

| Percent 2 MB | Other Material [1] | Time of weathering for reduction of elongation from 600% to 200% in Florida (months) |
|---|---|---|
| 0.2 | 0.1% 2,4-dihydroxybenzophenone | 12 |
| 0.2 | 0.2% octyl phenol | 12 |
| 1.0 | 0.1% 2,4-dihydroxybenzophenone | 12 |
| 0.1 | do | 12 |
| 1.0 | 0.3% "Monastral" Blue | 18+ |
| 1.0 | Condensation product of p-cresol, 2,4-xylenol, and butyraldehyde. | 18+ |
| 1.0 | 0.5% TiO₂ | 18+ |
| 1.0 | 0.5% Cadmium Red | 18+ |
| 1.0 | 0.1% Cadmium Yellow | 18 |
| 1.0 | 0.3% "Monastral" Green | 18+ |
| 1.0 | 0.25% Cadmium Yellow, 0.45% Blue Lake M, 0.05% lampblack (Brown Mixture). | 9 |
| 1.0 | 1.0% "Sunolite" Wax | 15 |
| 0.2 | do | 6 |
| 0.2 | 0.2% "Sunolite" Wax | 6 |
| 0.2 | 0.2% "Wingstay" S | 6–9 |
| 1.0 | 0.3% "Monastral" Green | 15+ |
| 1.0 | 0.5% TiO₂ | 15+ |
| 0.2 | 0.2% "Stabylene" A | 6–9 |

[1] "Sunolite" Wax is a light-absorbing wax; "Wingstay" S and "Stabylene" A are commercial rubber additives.

TABLE C

Effect of exposure on tensile strength

[White and colored materials tested after exposure as 10″ x 12″ sheets in Florida.]

| Percent 2 MB | Antioxidant or Pigment | Tensile Strength, p. s. i. | | |
|---|---|---|---|---|
| | | Initial | 6 Mo. | 12 Mo. |
| 1.0 | | 2,150 | 2,240 | 1,460 |
| 1.0 | | 2,080 | 2,150 | 1,710 |
| 0.5 | | 2,060 | 2,170 | 1,420 |
| 2.0 | | 2,000 | 2,150 | 2,150 |
| 0.2 | | 2,120 | 1,570 | 1,210 |
| 0.05 | | 2,120 | 1,700 | 1,180 |
| 1.0 | Condensation product of p-cresol, 2,4-xylenol, and butyraldehyde. | 2,000 | 2,160 | 1,400 |
| 1.0 | TiO₂ | 2,200 | 1,660 | 1,390 |
| 1.0 | "Monastral" Blue | 2,080 | 2,040 | 1,430 |
| 1.0 | Cadmium Red | 2,100 | 1,700 | 1,350 |
| 1.0 | Cadmium Yellow | 2,140 | 2,160 | 1,630 |
| 1.0 | "Monastral" Green | 2,080 | 1,840 | 1,340 |
| 1.0 | Brown Mixture (cf. Table B). | 2,280 | 1,460 | 1,400 |

TABLE D

Effect of exposure on elongation to break

[Percent elongation to break of tensile strength sample reported in Table C.]

| Percent 2 MB | Antioxidant or Pigment | Percent Elongation | | |
|---|---|---|---|---|
| | | Initial | 6 Mo. | 12 Mo. |
| 1.0 | | 750 | 665 | 515 |
| 1.0 | | 700 | 640 | 515 |
| 0.5 | | 695 | 590 | 40 |
| 2.0 | | 680 | 640 | 610 |
| 0.2 | | 680 | 110 | 10 |
| 0.05 | | 700 | 500 | 10 |
| 1.0 | Condensation product of p-cresol, 2,4-xylenol, and butyraldehyde. | 685 | 675 | 45 |
| 1.0 | TiO₂ | 725 | 585 | 100 |
| 1.0 | "Monastral" Blue | 675 | 600 | 280 |
| 1.0 | Cadmium Red | 660 | 495 | 320 |
| 1.0 | Cadmium Yellow | 700 | 660 | 290 |
| 1.0 | "Monastral" Green | 660 | 575 | 100 |
| 1.0 | Brown Mixture (cf. Table B). | 685 | 195 | 40 |

TABLE E

Effect of exposure on cold brittleness temperature

[Cold brittleness temperature of white and colored polythene compositions containing 2 MB and the effect of outdoor exposure in Florida.]

| Percent 2 MB | Antioxidant or Pigment | ASTM—Cold Brittleness Temp., ° C. | | |
|---|---|---|---|---|
| | | Initial | 6 Mo. | 12 Mo. |
| 1.0 | | −70 | −75 | −65 |
| 1.0 | | −70 | −75 | −35 |
| 0.5 | | −70 | −75 | −35 |
| 2.0 | | −70 | −75 | −20 |
| 0.2 | | −70 | −10 | +15 |
| 0.05 | | −70 | −20 | +15 |
| 1.0 | Condensation product of p-cresol, 2,4-xylenol, and butyraldehyde. | −70 | −75 | −35 |
| 1.0 | TiO₂ | −70 | −55 | −50 |
| 1.0 | "Monastral" Blue | −70 | −60 | −20 |
| 1.0 | Cadmium Red | −70 | −60 | −50 |
| 1.0 | Cadmium Yellow | −70 | −70 | −20 |
| 1.0 | "Monastral" Green | −70 | −50 | −15 |
| 1.0 | Brown Mixture (cf. Table B). | −70 | −20 | −25 |

For comparison with the foregoing results numerous other stabilizers were tested. The data show that 2-mercaptoarylenoimidazoles and arylenoimidazole-2-alkyl sulfides, especially in concentrations from 0.1% up to the limit of retention by the ethylene polymer, are more effective than the best phenolic and amine inhibitors. These results are shown in the following table. In most instances duplicate tests are reported.

TABLE F

| Percent Stabilizer | Name of Stabilizer | Time of weathering for reduction of elongation from 600% to 200%, in Florida, months |
|---|---|---|
| 0.2 | 2 MB Zn salt | 3, 6 |
| 0.1 | 2 MB formaldehyde derivative (ca. two methylol groups). | 6, 6 |
| 0.5 | ----do---- | 12, 12 |
| 0.2 | 2-mercaptothiazoline | 3 |
| 1.0 | ----do---- | 3, 6 |
| 1.0 | beta-carboxyethylbenxothiazyl-2-sulfide. | 6, 6 |
| 0.2 | ----do---- | 6, 3 |
| 1.0 | 4-methyl-2-mercaptoimidazoline | 6, 6 |
| 0.5 | ----do---- | 6, 6 |
| 0.2 | ----do---- | 6, 6 |
| 0.05 | 2-mercaptobenzothiazole | 3, 3 |
| 0.2 | ----do---- | 3, 3 |
| 0.2 | ----do---- | 3, 3 |
| 0.05 | ----do---- | 3, 3 |
| 1.0 | ----do---- | 6 |
| 1.0 | 2 MB Cu salt | 6+ |
| 1.0 | benzimidazole-2-ethyl sulfide | 6+ |
| 1.0 | 1-phenyl-2-mercaptobenzimidazole | 6+ |
| 1.0 | diphenyl thiocarbazide | 6+ |
| 1.0 | ----do---- | 6+ |
| 1.0 | ----do---- | 6+ |
| 1.0 | 5-amino-2-mercaptobenzimidazole | 6 |
| 1.0 | alpha-naphthyl thiourea | 6+ |
| 2.0 | ----do---- | 6+ |
| 1.0 | N,N'-diphenyl-S-methyl isothiourea. | 6+ |
| 5.0 | Condensation product of CS₂ and p-phenylenediamine. | 6+ |
| 0.5 | ----do---- | 6+ |
| 1.0 | ----do---- | 6 |
| 2.0 | ----do---- | 6+ |
| 1.0 | benzimidazole | 3+ |
| 1.0 | methyl-iso-thiorea sulfate | 3+ |
| 2.0 | ----do---- | 3+ |
| 1.0 | thiourea | 3 |
| 2.0 | ----do---- | 3 |
| 3.0 | ----do---- | 3+ |
| 1.0 | 2-mercaptobenzoxazole | 3+ |
| 1.0 | beta-naphthalene thiol | 3+ |
| 1.0 | 5-methyl-2-mercaptobenzimidazole | 3+ |
| 2.0 | ----do---- | 3+ |
| 1.0 | 5-nitro-2-mercaptobenzimidazole | 3+ |
| 2.0 | ----do---- | 3+ |
| 1.0 | N-acetyl-2-mercaptobenzimidazole | 3+ |
| 2.0 | ----do---- | 3+ |
| 1.0 | 2-dibenzimidazolyl disulfide | 3+ |
| 1.0 | 2,6-di-t.-butyl-p-cresol | 6 |
| 1.0 | dixylenol butane | 6 |
| 1.0 | Condensation product of p-cresol, 2,4-xylenol, and butyraldehyde. | 3 |
| 0.5 | 2-6-dimethoxy phenol | 6 |
| 2.0 | phenyl-beta-naphthylamine | 9 |
| 1.0 | 65% phenyl-alpha-naphthylamine, 35% diphenyl-para-phenylene diamine. | 9 |
| 0.4 | di-beta-naphthyl-para-phenylene diamine. | 6 |

The practical applications of the present invention are rather obvious since the compositions claimed herein may be employed in general for all of the uses to which normally solid ethylene polymers are commonly applied. The compositions of this invention are, however, outstandingly useful for those applications which require prolonged outdoor exposure; for example, as fibers, molded articles, electrical insulation, and artificial rattan, etc. As an illustration, polythene rattan containing 1% of 2-mercaptobenzimidazole was extruded at 190° to 205° C. and quenched after removal from the die face. It was then cold-drawn to a 6:1 ratio; steam-drawn 14%, and relaxed 11.75%. Upon exposure for six months, the tensile strength and the percent elongation underwent no decrease whatever. After one year's exposure, the tensile strength had decreased slightly but was still more than 90% of the original tensile strength. In similar tests polythene which was not stabilized with 2 MB failed in only a few months.

The 2-mercaptobenzimidazole which may be employed in the practice of this invention is not a novel composition of matter, but has been known for many years (Liebig's Annalen, 221, 9, 1883), and has been employed heretofore as a vulcanizing agent for neoprene (Rubber Age, 67, 569–72 (1950)) and a stabilizer for natural rubber (Ind. Eng. Chem., 43, 456 (1951)).

The present invention is limited only except as set forth in the following claims.

What is claimed is:

1. A composition of matter comprising normally solid ethylene polymer and from 0.02% to 5.0% by weight of a light stabilizer of the formula

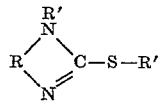

wherein R is an arylene group and R' is a member of the class consisting of H and hydrocarbon groups free from olefinic and acetylenic unsaturation.

2. A composition of matter comprising as the major component a normally solid polymer of ethylene and from 0.25–1.0% by weight of 2-mercaptobenzimidazole.

3. A composition of matter comprising a normally solid ethylene polymer, a pigment dispersed therein and from 0.2–5.0% by weight of 2-mercaptobenzimidazole.

4. A composition of matter comprising normally solid ethylene polymer and a 2-mercaptoarylenoimidazole compound.

5. A composition of matter comprising a normally solid ethylene polymer and a methylol reaction product of formaldehyde and a 2-mercaptoarylenoimidazole.

References Cited in the file of this patent

UNITED STATES PATENTS 1,933,962   Bögemann et al. _____ Nov. 7, 1933